Sept. 14, 1937.   R. F. BACON ET AL   2,092,794
RECOVERY OF SULPHUR
Original Filed July 29, 1930
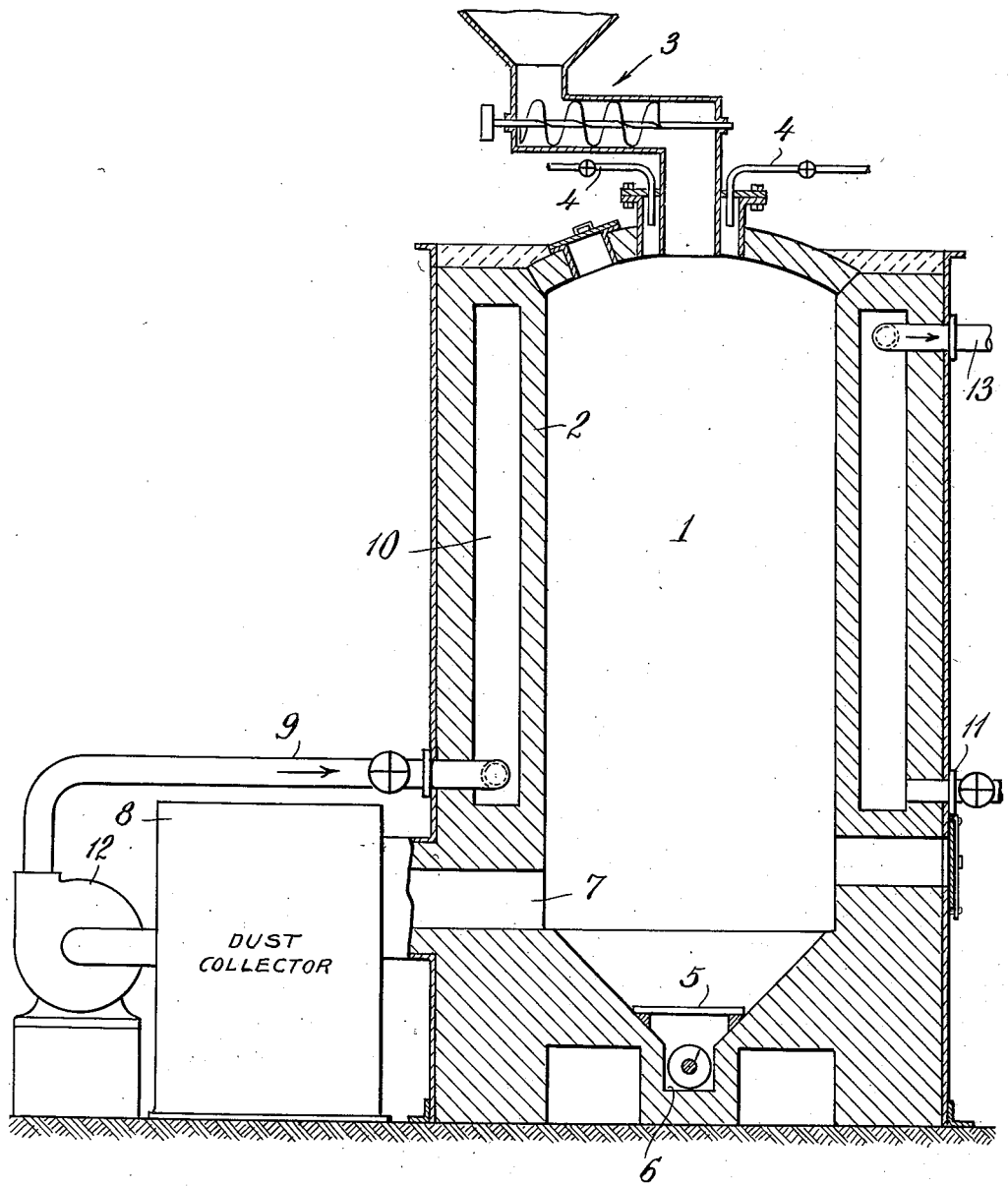
INVENTOR
RAYMOND F. BACON
AND ISAAC BENCOWITZ
BY
ATTORNEYS Patented Sept. 14, 1937

2,092,794

UNITED STATES PATENT OFFICE 2,092,794

RECOVERY OF SULPHUR

Raymond F. Bacon, Bronxville, and Isaac Bencowitz, New York, N. Y., said Bencowitz assignor to said Bacon Original application July 29, 1930, Serial No. 471,587. Divided and this application April 1, 1933, Serial No. 663,952

3 Claims. (Cl. 23—277)

This invention relates to the production of elemental sulphur, and has for its object recovery of sulphur from gases containing sulphur compounds such as sulphur dioxide. More particularly, the invention relates to improved and economically operated apparatus for obtaining sulphur in the elemental form from roaster gases and the like.

This application is a division of our copending application Serial No. 471,587, filed July 29, 1930, now Patent Number 1,917,234.

In the various processes and apparatus which have been suggested for the recovery of elemental sulphur from roaster gases and the like, it has usually been contemplated to treat the sulphur dioxide gases at a point removed from their source, with a resultant dissipation of a considerable amount of the sensible heat of these gases and creation of the necessity of supplying supplemental heat to replace heat so lost.

In accordance with our invention, the thermal and general efficiency of the sulphur recovery process is subsequently increased by utilizing apparatus of the nature described hereinafter, by means of which not only is the high sensible heat of the roasting gases discharged from the furnace substantially retained, but additional heat is derived also from the furnace itself.

The manner in which our invention is accomplished is as follows:

In the drawing an illustration of our invention is shown as applied to a shaft burner for the suspension roasting of pyrites fines wherein sulphur dioxide is produced.

Reference numeral 1 designates a shaft burner of any suitable and well known type, the shell 2 of which may be constructed of firebrick or other suitable refractory material. A hopper and feeding device 3 is provided at the top of said burner for the introduction of the pyrites fines, and nozzles 4 for the introduction of air or other oxidizing gas are disposed in the chamber in the neighborhood of the point of entry of the fines, to cause the oxidizing gas to intermingle therewith close to the point of entry.

At the bottom of the burner a grate 5 and cinder pit 6 are provided, from which the cinder may be removed in any well known manner, and at 7 is shown the outlet for the sulphur dioxide gases.

The outlet 7 preferably leads to a well insulated dust collector 8, closely adjoining the burner, which collector may be of any well known mechanical type, for example, a baffle chamber, or may be of the electrostatic precipitation type.

A conduit 9 for the roaster gases from the collector 8 connects tangentially with an annular reaction chamber 10 surrounding the burner shell 2, the outer wall of which chamber should be highly insulating and may be constructed of firebrick or other suitable refractory material, capable of withstanding the heat and corrosive action of the gases involved. An inlet pipe 11 provides for the introduction of reducing gas and the like into the chamber 10. A fan blower 12 is provided intermediate the collector 8 and the chamber 10, for providing properly regulated flow of the sulphur dioxide gases to the reaction chamber.

The gases from the reaction chamber 10 are discharged through pipe 13, which may be tangentially disposed to accelerate the discharge if desired, and are conducted to apparatus for collecting the elemental sulphur therein and for other treatment.

The operation of our invention is as follows:

The burner 1 is first brought up to a temperature considerably above the ignition point of the pyrites to be burned, and thereafter the fines are showered into the burner from the feeding device 3 accompanied by suitably controlled amounts of air or other oxidizing gas introduced through the nozzles 4.

The burning of the sulphur in the pyrites to sulphur dioxide, is accompanied by the liberation of a very substantial amount of heat, and the temperature of the resulting gases in the burner is quite high, for example 900 to 1000° C.

Upon completion of the reaction, the burned pyrites cinder will drop into the cinder pit 6, from which it may be removed in any well known manner. The hot sulphur dioxide gases are drawn off through the outlet 7 by the suction created by the fan blower 12, the necessity for using which proceeds in part from the maintenance of a practically neutral pressure over the cinder outlet, which coincidentally retards the flow of gases through the outlet.

While practically all of the burned pyrites will pass off through the cinder pit 6, a certain proportion of very fine dust will however, be entrained in the sulphur dioxide gases resulting from such suspension-roasting operation. This dust is removed by the dust collector 8.

After leaving the dust collector 8, the hot sulphur dioxide gases are passed tangentially into the chamber 10, where they are brought in contact with the reducing gases introduced at 11.

Natural gas, water gas, producer gas are suitable reducing gases, and if desired, powdered carbonaceous material may be injected into the chamber 10 in lieu thereof.

The sulphur dioxide gases are already very hot, inasmuch as there has been no very material opportunity for their sensible heat to be dissipated in their short passage after leaving the burner. The temperature of the reducing gases will be very considerably elevated upon their being intermingled with the hot sulphur dioxide gases.

The temperature of these gases is then further increased by the absorption of heat from the burner. To amplify the amount of heat so absorbed, the thickness of the shell 2 of the burner may be reduced, the major insulation being provided in the outer wall of the chamber 10.

The reaction between the sulphur dioxide gases and the reducing gases to yield elemental sulphur, is quite rapid and strongly exothermic, and with proper control, can be made to proceed to practical completion within the chamber 10. By the tangential introduction and discharge of the gases in the reaction chamber, the upwardly spiralling current engendered thereby, renders the path of flow and period of contact in this hot zone considerably longer than if straight vertical up-draft were used, with obvious advantage to the efficiency of the reaction.

The gases leaving the reaction chamber 10 through the outlet duct 13 may then be cooled in any suitable apparatus, for example a waste heat boiler, and treated in any well known manner to separate the sulphur therefrom, for example by electrostatic precipitation, absorption, or the like. The residual gases may then be oxidized catalytically, or in any other suitable manner well known in the art, to remove the objectionable COS and $H_2S$ therein and to recover sulphur from these and such other sulphur compounds, for example unreacted $SO_2$, as may be present therein.

It is to be noted further, that the absorption of heat from the burner by the gases to be reacted, can be turned to advantage for simultaneously minimizing the very objectionable tendency towards scar formation which accompanies pyrites roasting. It is generally considered that this scarring is ascribable to the existence of too high a temperature, which results in fusion of the FeS remaining after the volatile sulphur atom of the $FeS_2$ has been driven off.

This fusion does not ordinarily occur until after the volatile sulphur is removed, nor does it occur when there is a quantity of $Fe_2O_3$ present.

By reducing the temperature of the burner through the medium of heat absorption by these external sulphur dioxide and reducing gases, restraint may be placed upon the burners attaining a temperature where fusion of the FeS takes place. This heat absorption is preferably applied over that portion of the burner where the material being roasted is mainly in the FeS or scarring state, although, if desired, it may be extended throughout the furnace.

This absorption to restrain the scarring is best facilitated by reducing the thickness of the shell of the burner as much as possible, and particularly over that portion of the burner where scar formation principally takes place.

This absorption of heat from the burner by the sulphur dioxide, the reducing gases, or both, to elevate their temperature for the purpose of accelerating their interaction and the simultaneous application of this absorption to the purpose of minimizing scar formation may be accomplished in several manners.

In view of the rapidity with which the sulphur dioxide and the reducing gases interact, and the exothermic nature of that reaction, it is preferable that such absorption by these gases take place before they are in reacting contact. This can be accomplished, for example, by passing either of these gases through a jacket surrounding that portion of the burner at which scar formation is most active, and then conducting the gas heated in such passage, to another jacket disposed about a portion of the furnace, for example where appreciable amounts of $Fe_2O_3$ are present, or to a chamber removed from the burner, where it is reacted with the other gases.

The selection of the one of the two gases which should be passed about the scar formation zone will depend upon the conditions in and the nature of the respective gases. The sulphur dioxide gases from the dust collector while relatively hot, are of considerable volume, and this will to an extent compensate for the not so marked difference between their temperature and the temperature in the burner.

The reducing gases on the other hand, are at a very substantially lower temperature, but the advisability of taking advantage of this much greater temperature differential depends considerably upon the particular reducing gas which is being used.

The volume of producer gas and water gas utilized for reaction with the sulphur dioxide gases is appreciably greater than the volume of natural gas required therefor, and consequently when the former are used, the inclination would be towards their use as the heat absorbing gas as against the use of natural gas for such purpose.

The gas most advisable to select however, will depend upon the particular operating conditions existent, and is readily determinable by one skilled in the art.

An alternative to the passage of only one of the reacting gases in contact with the scar formation zone is presented by the passage of both gases simultaneously through that zone, at such a high rate of flow that their extent of reaction and heat generation will not be detrimental. This can be accomplished by suitably increasing the speed of pressure or suction blowers, with the elimination of tangential feeds and other factors which tend to maintain the gases within the zone for too long a period.

The hot intermingled gases discharged from the scar formation zone may then be permitted to react to substantial completion either in a separate chamber, or in a jacket surrounding a portion of the burner other than the scar formation zone.

Various other methods may be used to carry out this operation as will be apparent to one skilled in the art.

The gases resulting from the reaction can then be treated in the manner previously noted for the separation of sulphur therefrom.

While in the foregoing we have noted the application of our invention to a shaft burner in the suspension roasting of fines, the same is intended merely to be illustrative and is also applicable to mechanical or other burners, for burning either lump pyrites or pyrites smalls, as will be apparent to one skilled in the art.

The use of the dust collector 8 likewise is dictated by the particular type of roasting operation with which it is connected, and in those operations where a practically slight amount of dust results, it may be dispensed with if desired.

Likewise, down-draft of the gases in the roasting operation and up-draft of the heat absorbing gases externally of the burner, may be replaced by the reverse arrangement with the provision of suitable draft-producing means where necessary.

We claim:

1. Apparatus for the recovery of sulphur from sulphur-bearing material comprising a combustion chamber, means for introducing sulphur-bearing material into the combustion chamber, a closed reaction chamber surrounding the combustion chamber and thermally associated therewith, means for withdrawing gaseous products of combustion from the combustion chamber, means for tangentially introducing gaseous products withdrawn from the combustion chamber into the reaction chamber, and means for withdrawing gaseous reaction products from the reaction chamber.

2. Apparatus for the recovery of sulphur from sulphur-bearing material comprising a combustion chamber, means for introducing sulphur-bearing material into the combustion chamber in gaseous suspension, a closed reaction chamber surrounding the combustion chamber and thermally associated therewith, means for withdrawing gaseous products of combustion from the combustion chamber, means for tangentially introducing gaseous products withdrawn from the combustion chamber into the reaction chamber, and means for withdrawing gaseous reaction products from the reaction chamber.

3. Apparatus for the recovery of sulphur from sulphur-bearing material comprising a combustion chamber, means for introducing sulphur-bearing material into the combustion chamber, a reaction chamber surrounding the combustion chamber, means for withdrawing gaseous products of combustion from the combustion chamber, means for tangentially introducing gaseous products withdrawn from the combustion chamber into the reaction chamber, means for regulating the flow of gaseous products to the reaction chamber, and means for withdrawing the gaseous reaction products from the reaction chamber.

RAYMOND F. BACON.
ISAAC BENCOWITZ.